US012253258B2

(12) United States Patent
Clauss et al.

(10) Patent No.: US 12,253,258 B2
(45) Date of Patent: Mar. 18, 2025

(54) STEAM TREATMENT APPLIANCE

(71) Applicant: BSH Hausgeräte GmbH, Munich (DE)

(72) Inventors: Christian Clauss, Obernai (FR); Harry Fischer, Bretten (DE); Rudolf Schall, Bruchsal (DE)

(73) Assignee: BSH Hausgeräte GmbH, Munich (DE)

( * ) Notice: Subject to any disclaimer, the term of this patent is extended or adjusted under 35 U.S.C. 154(b) by 847 days.

(21) Appl. No.: 17/442,155

(22) PCT Filed: Apr. 22, 2020

(86) PCT No.: PCT/EP2020/061219
§ 371 (c)(1),
(2) Date: Sep. 23, 2021

(87) PCT Pub. No.: WO2020/224965
PCT Pub. Date: Nov. 12, 2020

(65) Prior Publication Data
US 2022/0154925 A1   May 19, 2022

(30) Foreign Application Priority Data
May 3, 2019   (DE) ..................... 10 2019 206 324.1

(51) Int. Cl.
F22B 1/28       (2006.01)
A47J 27/04      (2006.01)
(Continued)

(52) U.S. Cl.
CPC ................ *F22B 1/28* (2013.01); *A47J 27/04* (2013.01); *F22B 37/48* (2013.01); *F24C 14/005* (2013.01); *F24C 15/003* (2013.01)

(58) Field of Classification Search
None
See application file for complete search history.

(56) References Cited

U.S. PATENT DOCUMENTS 10,398,249 B2   9/2019  Becker
2016/0061490 A1  3/2016  Cho
(Continued)

FOREIGN PATENT DOCUMENTS

DE   102015225885 A1   6/2017
EP      3076086 A1   10/2016
(Continued)

OTHER PUBLICATIONS

EP 3 076 086 A1 (Clauss, Stéphane et al.) Oct. 5, 2016 [retrieved on Sep. 30, 2024]. Retrieved from Foreign Image and Text Database, translation by Clarivate Analytics. (Year: 2016).*
(Continued)

*Primary Examiner* — John J Norton
(74) *Attorney, Agent, or Firm* — Michael E. Tschupp; Andre Pallapies; Brandon G. Braun

(57) ABSTRACT

A steam treatment appliance includes a steam generation facility, a water tank for providing liquid for the steam generation facility, a first pump for pumping liquid out of the water tank and to the steam generation facility, an accommodating container, a second pump for pumping liquid out of the steam generation facility and to the accommodating container, and a third pump for pumping liquid out of the accommodating container and into the water tank.

7 Claims, 4 Drawing Sheets

(51) Int. Cl.
*F22B 37/48* (2006.01)
*F24C 14/00* (2006.01)
*F24C 15/00* (2006.01)

(56) References Cited

U.S. PATENT DOCUMENTS

2016/0360916 A1 12/2016 Jeda
2017/0363298 A1* 12/2017 Clauss ................. F24C 15/325
2018/0070596 A1 3/2018 Ki

FOREIGN PATENT DOCUMENTS

FR 2958719 A1 10/2011
WO 2012022607 A1 2/2012

OTHER PUBLICATIONS

National Search Report DE 10 2019 206 324.1 dated May 3, 2019.
International Search Report PCT/EP2020/061219 dated Jul. 3, 2020.

* cited by examiner

STEAM TREATMENT APPLIANCE

CROSS-REFERENCES TO RELATED APPLICATIONS

This application is the U.S. National Stage of International Application No. PCT/EP2020/061219, filed Apr. 22, 2020, which designated the United States and has been published as International Publication No. WO 2020/224965A1 and which claims the priority of German Patent Application, Serial No. 10 2019 206 324.1, filed May 3, 2019, pursuant to 35 U.S.C. 119 (a)-(d).

The contents of International Application No. PCT/EP2020/061219 and German Patent Application, Serial No. 10 2019 206 324.1 are incorporated herein by reference in their entireties as if fully set forth herein.

BACKGROUND OF THE INVENTION

The invention relates to a steam treatment appliance, having a steam treatment compartment which can be closed off by means of a door, a steam generation facility for generating steam, a water tank for providing liquid for the steam generation facility and a pump for pumping liquid out of the water tank and to the steam generation facility. The invention can be particularly advantageously applied to household appliances for steam treatment of food, specifically to steam cooking appliances.

DE 10 2012 109 631 A1 discloses a cooking appliance with a cooking compartment for the treatment of items to be cooked and with a steam generation facility for generating steam. The water used to generate the steam can be supplied to the steam generation facility via a coupling facility. The coupling facility has a connection facility suitable for connecting to a fixed water connection. In this context, a conduit facility is provided between the connection facility and the steam generation facility, said conduit facility providing a flow connection suitable for conducting water and comprising a free gradient section. A water guiding facility is arranged in the free gradient section.

FR 2958719 A1 discloses an oven, which has a cooking compartment embodied in a housing and a steam generator, which generates steam that can be introduced into the cooking compartment. A water filling valve supplies a hydraulic system with water from the steam generator. A water filling valve comprises a water supply opening of the hydraulic system. A drain part has a water drain opening of the hydraulic system. The water supply opening and the water drain opening can be accessed on an outer side of the oven when the valve is in an outlet position.

BRIEF SUMMARY OF THE INVENTION

It is the object of the present invention to overcome the disadvantages of the prior art, at least in part, and, in particular, to provide a possibility for using a steam treatment appliance in a particularly simple and user-friendly manner.

This object is achieved in accordance with the features of the independent claims. Advantageous embodiments are the subject matter of the dependent claims, the description and the drawings.

The object is achieved by a steam treatment appliance, having
a steam generation facility for generating steam,
a water tank for providing liquid for the steam generation facility and three pumps.

The use of the three pumps makes it possible, in addition to conventionally topping up the steam generation facility with water from the water tank, to pump liquid into the appliance in a simple and user-friendly manner, to drain liquid from the appliance and/or to allow liquid to circulate in the appliance. In this context, due to the conveying effect of the pumps, the water tank and the steam generation facility are also advantageously in principle able to be positioned as desired in the appliance, for example above the steam treatment compartment.

The steam treatment appliance is in particular a household appliance. In one development, it has a steam treatment compartment which can be closed off by means of a door. In another development, the steam treatment appliance has at least one heating body for heating the steam treatment compartment and/or the item located therein, and can then also be referred to as steam cooking appliance, and the steam treatment compartment thereof as cooking compartment. The steam treatment appliance may, for example, be an oven with steam treatment function, a microwave appliance with steam treatment function or an oven with microwave and steam treatment function. Items located in the cooking compartment may optionally be cooked without the addition of steam, cooked with the addition of steam, or only treated with steam.

In one development, the steam generation facility may be a heatable water tray embedded in a bottom of the steam treatment compartment. In one development, the steam generation facility is arranged outside the steam treatment compartment, e.g. in the form of a boiler or a continuous flow heater. The steam generator can be filled with liquid from the water tank by means of one of the pumps.

For steam generation, the steam generator has at least one heating element, during the activation of which water located in the steam generator can be heated to boiling temperature. The steam generated thereby is introduced into the steam treatment compartment.

In one development, the water tank is a water tank which can be removed on the part of the user and can then typically be filled with water by a user. In one development, the water tank is installed in the appliance in a fixed manner. It can then be filled with water on the part of the user via a filler opening, for example. As an alternative or in addition, the water tank can be filled with water via a fixed water connection.

The steam generator may have a fill level sensor. This may be configured, for example, to identify or detect an empty state and/or a reaching of a maximum fill level of the steam generator. Depending upon the currently present fill level, the steam treatment appliance may, for example, activate or deactivate the at least one heating element, activate one of the pumps in order to top up with water, etc.

In one embodiment, of the three pumps,
one pump ("first pump") is provided or configured to pump liquid out of the water tank and to the steam generation facility,
a further pump ("second pump") is provided to pump liquid out of the steam generation facility and to an accommodating container and
another further pump ("third pump") is provided to pump liquid out of the accommodating container and into the water tank.

Such functionality of the three pumps advantageously makes it possible, in addition to conventionally topping up the steam generation facility with water from the water tank by means of the first pump, to pump in principle any kind of liquid into the appliance in a structurally particularly simple manner by means of the third pump, to drain said liquid from the appliance by means of the second pump and/or to allow said liquid to circulate in the appliance by activating or operating all three pumps. In one development, the pumps can be activated or operated independently of one another, in particular by means of a control facility of the steam treatment appliance.

The accommodating container may be installed in the appliance in a fixed manner, arranged in the appliance such that it can be removed, or fluidically connected to the appliance as an independent accommodating container, e.g. via a fluidic connection interface or "port", such as a connection nozzle or a hose. In particular, the port is a through-flow opening open to the outside, which in particular can be closed off from a fluidic perspective manually by a user by means of a closure element, such as a plug or a closure cap or the like.

In one development, a suction-side connection or input of the first pump is connected to the water tank, a suction-side connection or output of the first pump is connected to the steam generation facility, the steam generation facility is further connected to an input of the second pump, an output of the second pump is connected to a connection line that leads to the accommodating container, an input of the third pump is connected to a connection line that leads to the accommodating container, and an output of the third pump is connected to a connection line that leads to the water tank.

The pumps are liquid pumps. In one development, the pumps are self-locking pumps, i.e. they have a blocking effect in the inactive or switched-off state. This achieves the advantage that the number of structural parts required can be kept low. In principle, however, instead of a self-locking pump, it is also possible to use a functionally similar arrangement of a non-locking pump (which allows liquid through in the switched-off state) and a locking valve, e.g. in a fluidic series connection. The pump may be a positive displacement pump (volumetric pump) or a centrifugal pump, for example. In this context, a centrifugal pump has the advantage that it is especially quiet and robust. A positive displacement pump has the advantage that it can be embodied in an especially simple self-locking manner.

In one embodiment,
an input of the first pump and an output of the third pump are connected to a shared first connecting piece, which is fluidically connected to the water tank,
an output of the first pump and an input of the second pump are connected to a shared second connecting piece, which is fluidically connected to the steam generation facility and
an output of the second pump and an input of the third pump are connected to a shared third connecting piece, which is fluidically connected to a port for the accommodating container.

This results in the advantage of an embodiment which is particularly simple and cost-effective to implement from a structural perspective and also is robust and particularly simple to install. The connecting pieces may in particular be shaped as tubes open on one side, and in particular have two connection nozzles branching off from the side for connecting to the corresponding pumps, wherein the connection to the water tank, the steam generation facility or the port then takes place via the end open on the end face, for example. In a development which is particularly compact to implement, the connection nozzles may be connected directly to the corresponding connections of the pumps.

Alternatively, the output of the second pump may be fluidically connected to a first port and the input of the third pump to a second port.

In one development, the liquid is blocked from flowing through a respective pump when the pump is not activated or not operated. To this end, the pump may be embodied as a self-locking pump or be interconnected with a corresponding valve.

In one embodiment, the connecting pieces are straight-line connecting pieces, which are arranged in an X-shape in relation to one another. A particularly compact arrangement is achieved as a result. This is particularly advantageous if the connecting pieces are arranged above the treatment compartment, as they can thus be installed in a very flat manner. An X-shape can be understood in particular as meaning that two of the connecting pieces are arranged obliquely or in an X-shape in relation to one another and the remaining connecting piece is arranged in parallel with one of the connecting pieces that are arranged in an X-shape in relation to one another.

In one embodiment, the connecting pieces are connected to one another mechanically. This advantageously makes them particularly easy to handle and install and reliable to retain in the appliance. The mechanical connection may have a positive fit, non-positive fit and/or material fit. Thus, the two connecting pieces arranged in parallel with one another may be produced in one piece or welded, adhesively bonded and/or clamped to one another, etc. Connecting pieces arranged in an X-shape in relation to one another may be inserted into one another with a positive fit, for example, or welded, adhesively bonded and/or clamped to one another, etc.

In one embodiment, the pumps are arranged in parallel adjacent to one another. A compact design is thus supported. For example, the pumps may be arranged adjacent to one another in a horizontal arrangement above the treatment compartment. This also achieves the advantage that the pumps can be connected to connecting pieces arranged in an X-shape in relation to one another in a simple manner, in particular directly (i.e. without liquid-guiding intermediate pieces such as hoses, tubes, etc.).

In one embodiment, the pumps are arranged in a shared water collection dish. The water collection dish results in the advantage that at least leakages of the pumps can be collected at the pump connections and leakage liquid does not run into the appliance in an uncontrolled manner, where it would lead to corrosion, for example. In one development, the connecting pieces are also arranged in this water collection dish. As a result, it is advantageously also possible for leakages at the connections of the connecting pieces to be collected.

In one embodiment, the water collection dish has a drain. An uncontrolled overflowing of the water collection dish can thus be prevented, at least when a level predefined by the position of the drain is reached.

In one development, the drain leads into the water tank. Thus, the leakage liquid can advantageously be reused. This also makes it possible to dispense with a separate drainage duct. In one development, the drain is connected to a drainage duct that leads toward the outside (outside the appliance). This results in the advantage that the leakage liquid does not remain in the appliance. The drainage duct may, for example, lead toward the outside in a bottom region of the appliance.

In one embodiment, the water collection dish is produced in one piece with the water tank, e.g. as a plastic injection molded part. This simplifies production and assembly.

In one embodiment, the steam treatment appliance can be operated in at least two operating modes, of which in a steam treatment operating mode the second pump and the third pump are deactivated; and in a cleaning operating mode all three pumps can be activated.

This achieves the advantage that a conventional steam treatment operating mode for treating items located in the cooking compartment and a particularly effective cleaning operating mode can be provided in a resource-efficient manner. The steam treatment appliance may have a plurality of steam treatment operating modes. The steam treatment appliance may also have yet more operating modes, e.g. a heat-retaining operating mode, a pyrolysis operating mode, etc.

Specifically, in the cleaning operating mode, by activating or operating all three pumps, it is possible to implement a circuit for cleaning liquid (e.g. as part of a cleaning program), which enables a particularly thorough cleaning. The cleaning liquid may have a disinfecting or antimicrobial and/or decalcifying effect. In one development, the cleaning liquid may therefore be a decalcifying liquid, possibly with additional antimicrobial effect.

The object is also achieved by a method for operating a steam treatment appliance, in which, in the cleaning operating mode, a) the third pump is activated in order to pump cleaning liquid out of the accommodating container and into the water tank;

b) the first pump is activated in order to pump the cleaning liquid out of the water tank and into the steam generation facility and c) the second pump is activated in order to pump the cleaning liquid out of the steam generation facility and into the accommodating container.

The method may be embodied in an analogous manner to the steam treatment appliance and has the same advantages.

In one embodiment, steps a) to c) are run through in succession, i.e. step b) is only performed when step a) has concluded and step c) is only performed when step b) has concluded. This achieves the advantage that a sufficiently long exposure duration of the cleaning liquid can be achieved in a particularly simple manner. Specifically, this also makes it possible for the amount of cleaning liquid required to be kept low.

In one embodiment, exposure pauses may be inserted between steps a) to c). These may be identical or may differ. This achieves the advantage that a particularly effective cleaning is achieved, specifically of the water tank and steam generation facility components which are exposed to the water for a particularly long time. The exposure pauses may be identical or may differ. Thus, the cleaning liquid can be kept in the steam generation facility for a particularly long time, in order to counteract the typically high degree of calcification thereof. It is also possible for a cleaning liquid to be kept in the water tank for a particularly long time, in order to disinfect it in a particularly thorough manner or to remove microbial films etc.

In one embodiment, steps a) to c) may be run through multiple times. Thus, a circuit for the cleaning liquid can be provided which allows a particularly effective cleaning with a low amount of cleaning liquid. In this embodiment, in step c), cleaning liquid pumped back into the accommodating container is pumped back into the water tank in a subsequent step a).

In one development, during the cleaning operating mode, the water tank is at least partially filled with water and/or water is added thereto. This achieves the advantage that the cleaning liquid may initially be present as a concentrate, which is diluted by the water. This makes it easier for a user to handle and store the cleaning liquid.

In one development, in order to perform the cleaning operating mode, a user may for example fluidically connect the port to a container (e.g. a bucket, a decanter, a bottle or a container provided specifically for this purpose), in which the cleaning liquid or a corresponding concentrate is located, e.g. via a hose. By means of the third pump, the cleaning liquid is pumped into the water tank, which is empty or partially filled with water, and water is also added to the water tank if necessary. In this context, the connection line leading from the port to the water tank and the water tank are cleaned. The cleaning liquid optionally after a predefined first exposure pause in the water tank which may depend upon a degree of calcification is then conducted into the steam generation facility by means of the first pump and as a result cleans the connection line that leads from the water tank into the steam generation facility (if present) and the steam generation facility. Subsequently optionally after a predefined second exposure pause in the steam generation facility which may depend upon a degree of calcification the cleaning liquid is pumped through the port back into the container. As a result, the connection line that leads from the steam generation facility to the port is also cleaned. In one variant, the cleaning procedure is now concluded. In another variant, the above steps are performed once more, e.g. for a predefined period of time which may depend upon a degree of calcification.

In order to increase an effectiveness of the cleaning liquid or of the cleaning agent, the steam generation facility may be switched on during the cleaning operating mode, in particular such that the temperature of the cleaning liquid increases, but advantageously such that it does not boil.

In one development, in the cleaning operating mode, a rinsing procedure follows the cleaning procedure. Remaining cleaning liquid can advantageously be removed from the appliance as a result. In one development, this can be implemented such that, after the cleaning procedure, the consumed cleaning fluid is emptied from the container by a user, the container is rinsed out and is then filled with clear water. In order to perform the rinsing procedure, it is then possible for steps similar to the cleaning procedure to be performed, possibly without exposure pause(s). In a particularly user-friendly development, the water is provided by the appliance, e.g. by intaking fresh water from the fixed water connection, so that a user just has to connect the port to an empty container.

BRIEF DESCRIPTION OF THE DRAWINGS

The above-described properties, features and advantages of this invention and the manner in which these are achieved will become clearer and more readily understandable in connection with the following schematic description of an exemplary embodiment, which will be described in further detail making reference to the drawings.

DETAILED DESCRIPTION OF EXEMPLARY EMBODIMENTS OF THE PRESENT INVENTION

Figure 1:
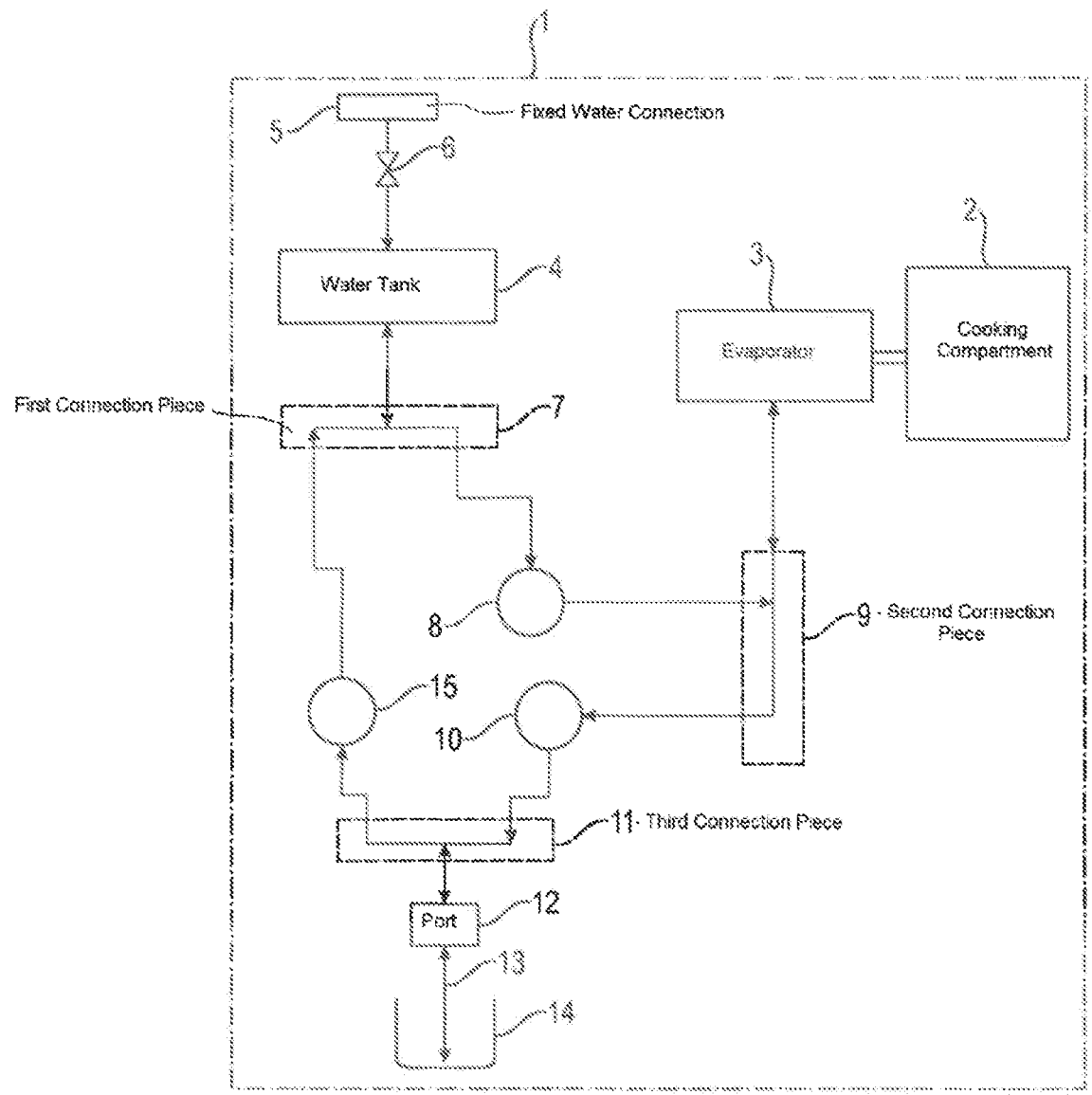
FIG. 1 shows an equivalent circuit diagram of a liquid system of a steam treatment appliance with three pumps.
Figure 5:
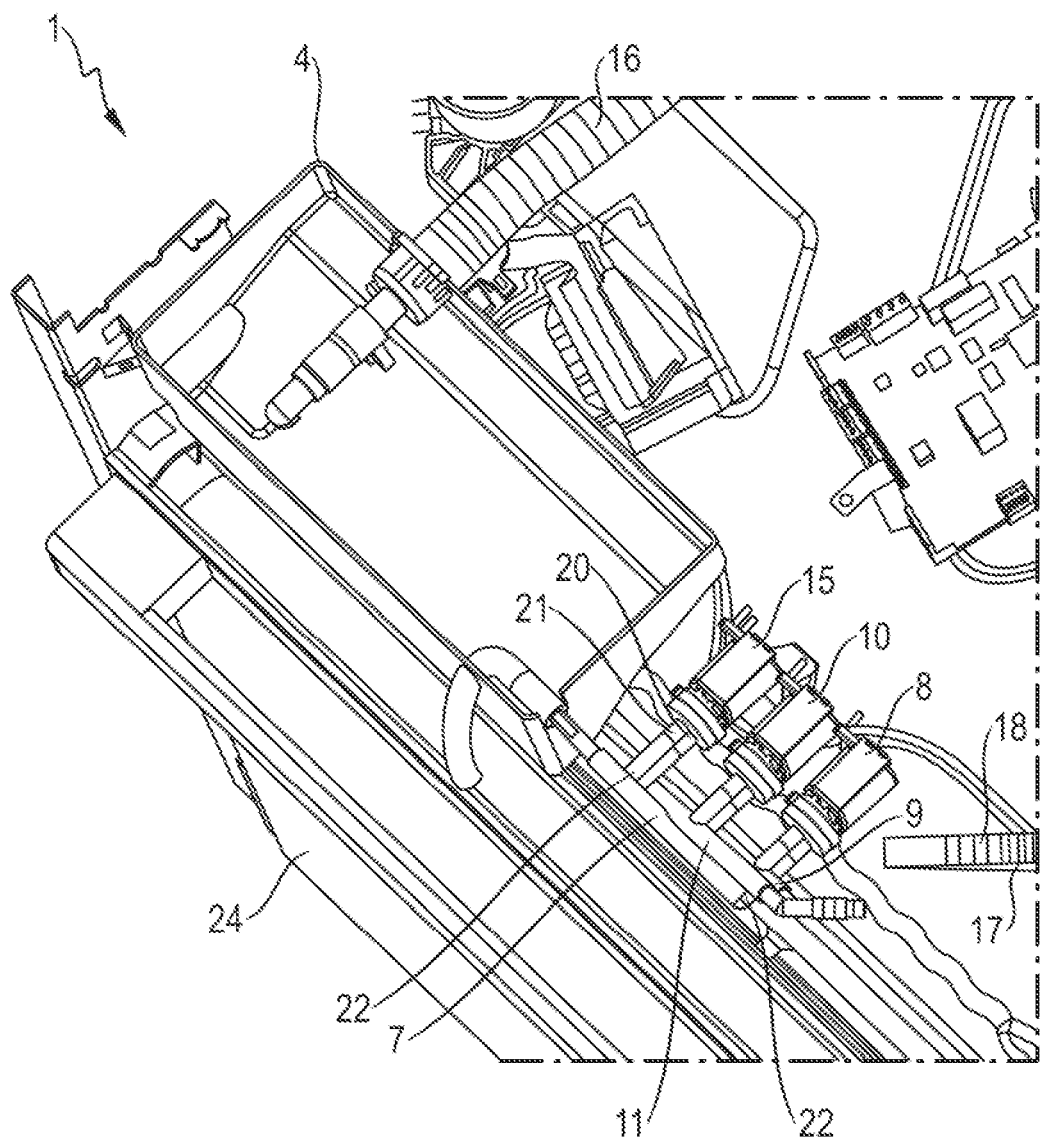
FIG. 5 shows an oblique view of an enlarged portion of a steam treatment appliance with three pumps in accordance with a second exemplary embodiment in the region of the three pumps.

FIG. 1 shows an equivalent circuit diagram of a liquid system of a steam treatment appliance 1. The steam treatment appliance 1 may, for example, be an oven with steam treatment function, a microwave appliance with steam treatment function or an oven with microwave and steam treatment function. It has a steam treatment compartment in the form of a cooking compartment 2, which can be closed off by means of a door 24 (see FIG. 5), and a steam generation facility. Here, the steam generation facility is embodied as an evaporator 3 arranged outside the cooking compartment 2. By means of the evaporator 3, it is possible for liquid contained therein to be heated, in particular also brought to boiling. During a steam cooking operation, the water vapor that occurs is conducted out of the evaporator 3 and into the cooking compartment 2, in order to steam-cook food that is located there.

The steam treatment appliance 1 furthermore has a water tank 4, which is installed in a fixed manner here, by means of which the evaporator 3 can be supplied with liquid. The water tank 4 can be filled with fresh water by means of a fixed water connection 5, e.g. by corresponding opening and closing of a locking valve 6.

The water tank 4 is fluidically connected to a suction side or input of a first self-locking pump 8 via a first connecting piece 7. The pressure side or output of the first pump 8 is fluidically connected to the evaporator 3 via a second connecting piece 9. The second connecting piece 9 is further connected to an input of a second self-locking pump 10. The output of the first pump 8 and the input of the second pump 10 are therefore fluidically connected to one another directly via the second connecting piece 9.

The output of the second pump 10 is connected to a port 12, e.g. a connection nozzle, via a third connecting piece 11. It is possible to connect a liquid line 13, such as a hose or the like, to the port 12 in order to fluidically connect the port to a container 14 provided on the part of the user, such as a bucket, a decanter or the like. To this end, the liquid line 13 may be suspended in the container 14 in a simple manner, for example. The third connecting piece 11 is furthermore connected to a suction-side input of a third self-locking pump 15, which is fluidically connected at its output to the first connecting piece 7 and moreover to the water tank 4. Accordingly, the output of the second pump 10 and the input of the third pump 15 are also fluidically connected to one another directly via the second connecting piece 9, and the output of the third pump 15 and the input of the first pump 8 are fluidically connected to one another directly via the third connecting piece 7.

During a steam cooking operation, the second pump 10 and the third pump 15 are deactivated and therefore connected in a blocking manner from a fluidic perspective. During operation of the first pump 8, water is therefore practically only pumped out of the water tank 4 and into the evaporator 3, in order to supply it with water.

A cleaning operation may be performed as follows, for example:

First, a user connects the port 12 to the liquid line 13 and plugs the liquid line 13 into the container 14 that is at least partially filled with cleaning liquid. The pumps 8, 10 and 15 are deactivated in this case.

Subsequently, the third pump 15 is activated, in order to draw the cleaning liquid out of the container 14 and to conduct it through the third connecting piece 7 into the water tank 4 that may already be partially filled with water. The third pump 15 is then deactivated. As an alternative or in addition, it is possible for water to be introduced into the water tank 4 from the fixed water connection 5. If the cleaning liquid in the container 14 is already sufficiently diluted, then no additional water has to be added.

The cleaning liquid can now optionally be left in the water tank 4 for a certain period of time ("exposure pause").

In the next step, the first pump 8 is activated, in order to pump the cleaning liquid out of the water tank 4, through the first connecting piece 9 and into the evaporator 3. The first pump 8 is then deactivated.

The cleaning liquid can now optionally be left in the evaporator 3 for a certain further period of time ("exposure pause"). Optionally, the evaporator 3 can heat the cleaning liquid for an increased cleaning effect, but only to a temperature below a boiling temperature (e.g. to 40° C. or 50° C.), in order to prevent cleaning liquid vapor from entering the cooking compartment 2.

In a next step, the second pump 10 is activated, in order to pump the cleaning liquid out of the evaporator 3, through the second connecting piece 11 and through the port 12 back into the container 14. The second pump 10 is then deactivated.

This procedure can now be repeated multiple times in particular without adding (further) water.

When the cleaning procedure is terminated, this can be followed by a similar rinse cycle. The water used for this purpose can originate from the container 14 refilled with clear water or from the fixed water connection 5.

Alternatively, it is also possible for two or all three pumps 8, 10, 15 to be operated simultaneously, e.g. in order to enable an uninterrupted circuit of the cleaning liquid and/or the clear water.

Figure 2:
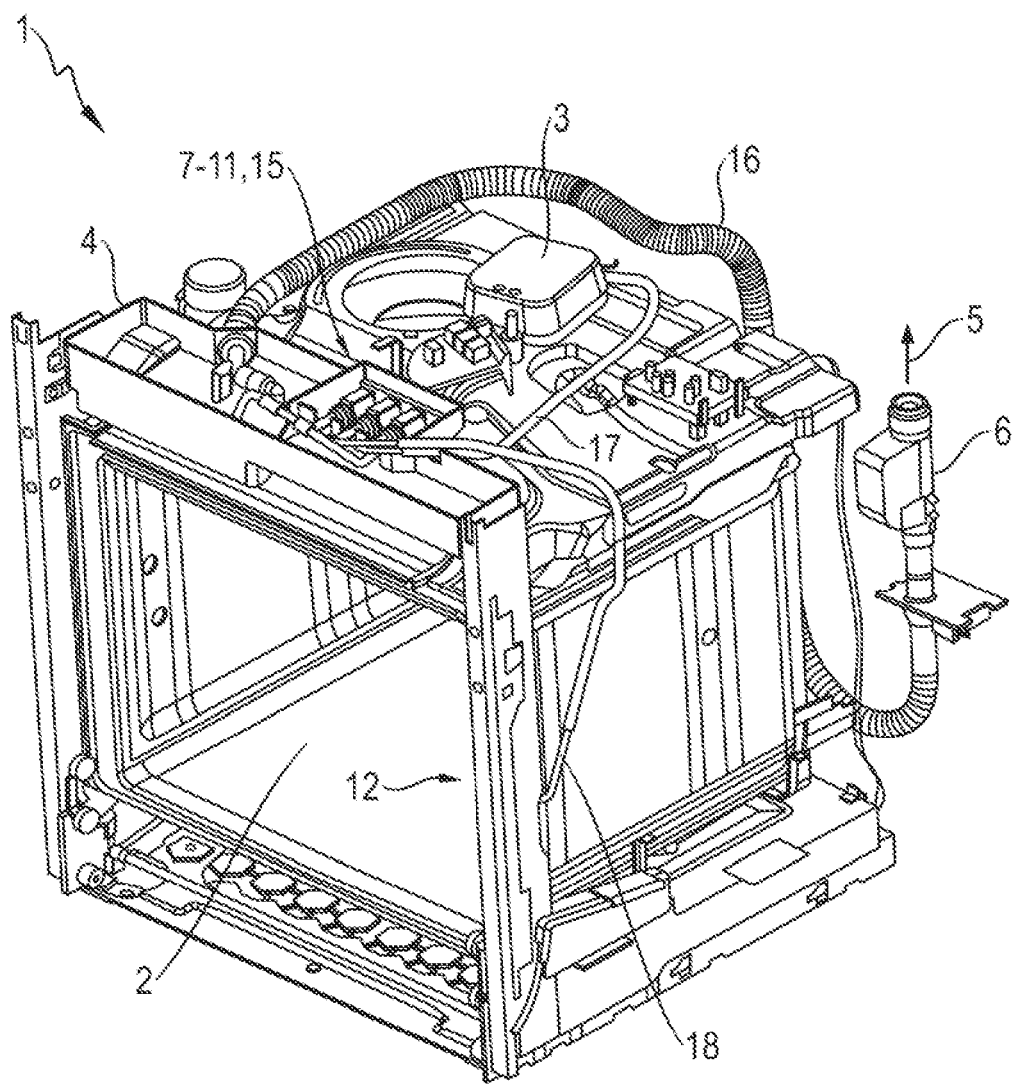
FIG. 2 shows an oblique view of a steam treatment appliance corresponding to FIG. 1 in accordance with a first exemplary embodiment without housing and without door.

FIG. 2 shows an oblique view of the steam treatment appliance 1 in accordance with a first exemplary embodiment without housing and without door. The evaporator 3, the water tank 4, the pumps 8, 10, 15 and the connecting pieces 7, 9, 11 are arranged above the cooking compartment 2. The fixed water connection 5 can be connected to an AquaStop valve 6, which is able to conduct fresh water into the water tank 4 via a connection line 16 which is hose-like, at least in sections. The first connecting piece 9 is fluidically connected to the evaporator 3 via a further connection line 17. The second connecting piece 11 is fluidically connected to the port 12 via another further connection line 18. Here, the port 12 can be accessed on an inner side of the cooking compartment 2 by a user.

Figure 3:
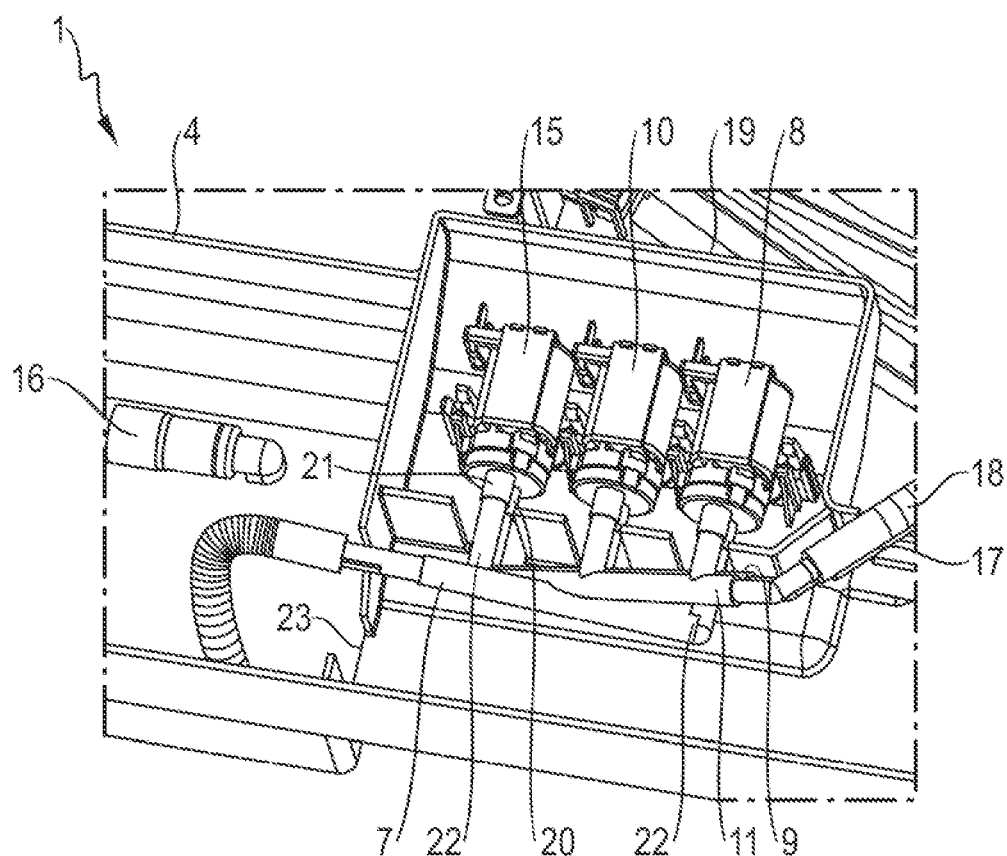
FIG. 3 shows an oblique view of an enlarged portion of the steam treatment appliance in accordance with the first exemplary embodiment in the region of the three pumps.

FIG. 3 shows an oblique view of an enlarged portion of the steam treatment appliance 1 in the region of the three pumps 8, 10, 15 and the connecting pieces 7, 9, 11.

The pumps 8, 10 and 15 and the connecting pieces 7, 9, 11 are arranged and fastened in a water collection dish 19, specifically arranged and oriented in parallel adjacent to one another. The pumps 8, 10 and 15 are in particular of the same kind and have an input nozzle 20 as input and, above it, an output nozzle 21 as output, as shown by way of example on the basis of the third pump 15.

The connecting pieces 7, 9 and 11 are embodied as straight-line, tube-shaped connecting pieces, from which two connection nozzles 22 branch off from the side in the same direction toward the pumps 8, 10 and 15 in each case. On the end face side, the connecting pieces 7, 9 and 11 are connected to the water tank 4, the evaporator and to the port 12, respectively.

The two connecting pieces 9 and 11 are arranged in parallel with one another, while the connecting piece 7 stands obliquely thereto, so that the connecting pieces 7, 9 and 11 are arranged in an X-shape in relation to one another. In particular, it is possible for two or three of the connecting pieces 7, 9 and 11 to be connected to one another mechanically, which facilitates the ease of handling thereof e.g. during assembly and results in a particularly reliable arrangement.

Figure 4:
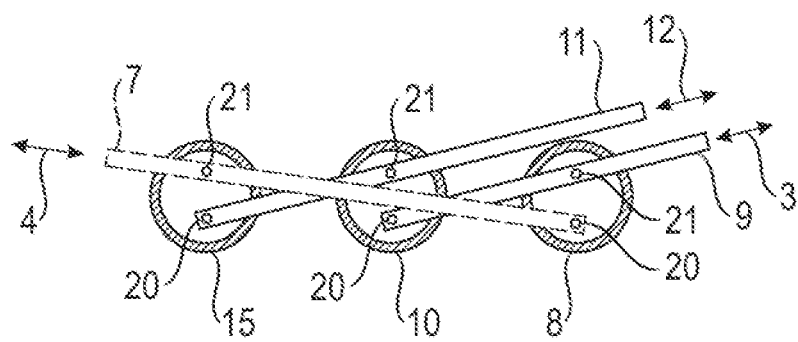
FIG. 4 shows a front view of an outline of a fluidic interconnection of the three pumps.

FIG. 4 shows, in a front view of the connection-guiding end faces of the pumps 8, 10 and 15, an outline of their fluidic interconnection with the connecting pieces 7, 9 and 11.

Returning to FIG. 3 again, the water collection dish 19 is used to collect and drain free liquid, such as condensed water, leakage liquid, etc., that is generated at the pumps 8, 10 and 15 and the connecting pieces 7, 9 and 11. In one variant, to this end the water collection dish 19 opens at a through-hole 23 in the water tank 4, so that the free liquid can drain into the water tank 4. In another variant, the water collection dish 19 is provided (i.e. shaped and arranged) so as to conduct the liquid that it collects into a drain (not shown). In the latter case, it is likewise possible for the through-hole 23 to be present, specifically in order for liquid that overflows from the water tank 4 into the water collection dish 19 to be conducted into the drain. Thus, the water tank 4 is prevented from overflowing beyond its upper edges.

Here, the water dish 19 and the water tank 4 are embodied as a structural part produced in one piece, for example a plastic injection molded part.

FIG. 4 shows an oblique view of an enlarged portion of one variant of the steam treatment appliance 1 in the region of the three pumps 8, 10, 15. In this variant, the pumps 8, 10, 15 and the connecting pieces 7, 9 and 11 are not arranged in the water dish 19, but rather directly on the upper side of the cooking compartment 2. Additionally, a door 24 which closes off the cooking compartment 2 on the front side is now drawn.

The present invention is of course not restricted to the exemplary embodiment shown.

In general, "a", "an", etc. can be understood as singular or plural, in particular in the sense of "at least one" or "one or more", etc., provided this is not explicitly excluded, e.g. by the expression "precisely one", etc.

A numerical value can also include the given value as well as a typical tolerance range, provided this is not explicitly excluded.

The invention claimed is:

1. A steam treatment appliance, comprising:
a steam generation facility;
a water tank for providing liquid for the steam generation facility;
a first pump for pumping liquid out of the water tank and to the steam generation facility;
an accommodating container;
a second pump for pumping liquid out of the steam generation facility and to the accommodating container;
a third pump for pumping liquid out of the accommodating container and into the water tank, and
a shared first connecting piece fluidically connected to the water tank, with an input of the first pump and an output of the third pump being connected to the first connecting piece;
a shared second connecting piece fluidically connected to the steam generation facility, with an output of the first pump and an input of the second pump being connected to the second connecting piece; and
a shared third connecting piece fluidically connected to a port for the accommodating container, with an output of the second pump and an input of the third pump being connected to the third connecting piece.

2. The steam treatment appliance of claim 1, wherein the first, second and third pumps are arranged in parallel adjacent to one another, and wherein the first, second and third connecting pieces are straight-line connecting pieces and arranged in an X-shape in relation to one another.

3. The steam treatment appliance of claim 1, wherein the first, second and third connecting pieces are connected to one another mechanically.

4. The steam treatment appliance of claim 1, further comprising a shared water collection dish, wherein the first, second and third pumps and/or the first, second and third connecting pieces are arranged in the water collection dish.

5. The steam treatment appliance of claim 4, wherein the water collection dish includes a drain that leads into the water tank.

6. The steam treatment appliance of claim 4, wherein the water collection dish is produced in one piece with the water tank.

7. The steam treatment appliance of claim 1, wherein the steam treatment appliance is operable in a steam treatment operating mode in which the second pump and the third pump are deactivated, and a cleaning operating mode in which the first, second and third pumps are activated.

* * * * *